United States Patent [19]
Johnsen

[11] Patent Number: 5,298,823
[45] Date of Patent: Mar. 29, 1994

[54] MAIN FIELD WINDING AND CONNECTIONS FOR A DYNAMOELECTRIC MACHINE

[75] Inventor: Tyrone A. Johnsen, Rockford, Ill.

[73] Assignee: Sundstrand Corporation, Rockford, Ill.

[21] Appl. No.: 940,423

[22] Filed: Sep. 4, 1992

[51] Int. Cl.⁵ .................... H02K 11/00; H02K 3/48
[52] U.S. Cl. .............................. 310/71; 310/194; 310/214; 310/261
[58] Field of Search ............... 310/71, 194, 214, 216, 310/261, 270, 179, 180

[56] References Cited

U.S. PATENT DOCUMENTS

| | | | |
|---|---|---|---|
| 3,292,025 | 12/1966 | Victor | 310/208 |
| 4,217,515 | 8/1980 | Long et al. | 310/270 |
| 4,562,641 | 1/1986 | Mosher et al. | 310/270 X |
| 4,583,696 | 4/1986 | Mosher | 310/270 X |
| 4,598,223 | 7/0186 | Glennon et al. | |
| 4,603,274 | 7/1986 | Mosher | 310/270 |

FOREIGN PATENT DOCUMENTS

| | | | |
|---|---|---|---|
| 2905639 | 8/1979 | Fed. Rep. of Germany | 310/214 |
| 0006069 | 1/1983 | Japan | 310/261 |
| 0185031 | 8/1986 | Japan | 310/261 |

Primary Examiner—R. Skudy
Assistant Examiner—E. To
Attorney, Agent, or Firm—Lawrence E. Crowe

[57] ABSTRACT

An improved rotor for a dynamoelectric machine which includes a rotor core of magnetizable material having a longitudinal axis and axially spaced core ends, winding end supports of electrically insulating material at the core ends, and a winding having a plurality of layers of continuously connected turns of wire and first and second exciter lead portions at electrically opposite ends of the winding. The first exciter lead portion includes a crossover section oriented generally transverse to the longitudinal axis and located at one of the core ends. The winding is oriented generally parallel to the longitudinal axis and extends around the core, over the crossover section of the first exciter lead portion of the winding, and over both winding end supports, forming a plurality of end turns at the core ends and thereby maintaining the core and the winding end supports fixed relative to each other and constraining the crossover section of the first exciter lead portion between the end turns and the winding end support. A slot and a recessed area are incorporated into the winding end support, with the slot allowing the crossover section of the first exciter lead portion of the winding to be conveniently routed between the end turns and the winding end support, and the recessed area providing constraint for the end turns, thereby preventing deformation of the end turns due to centrifugal forces incident with rotation of the rotor.

17 Claims, 2 Drawing Sheets

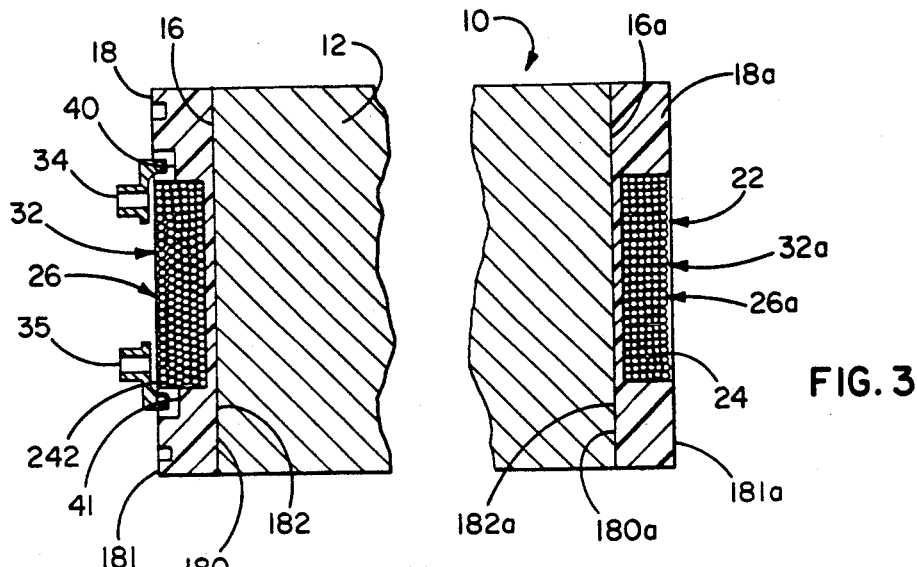
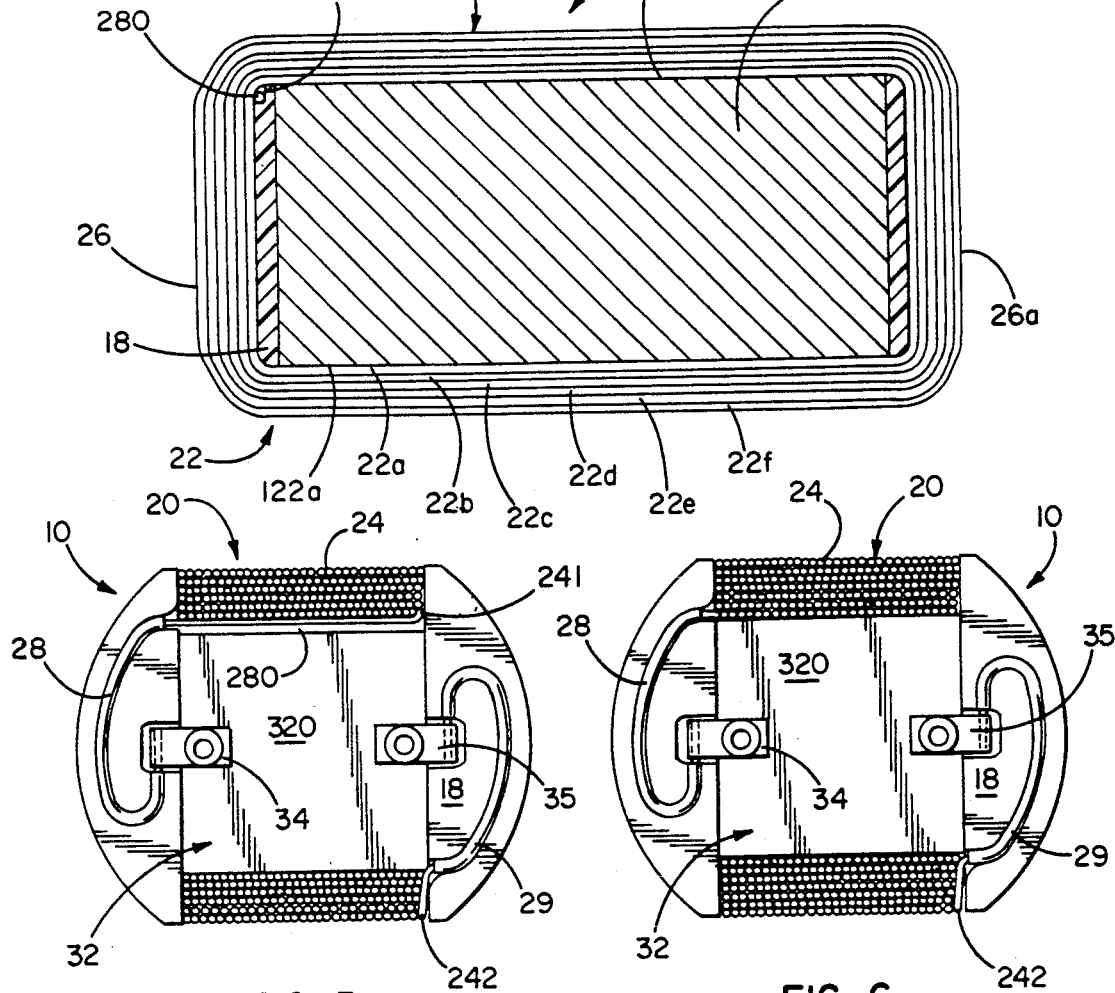
FIG. 3
FIG. 4
FIG. 5
FIG. 6

MAIN FIELD WINDING AND CONNECTIONS FOR A DYNAMOELECTRIC MACHINE

FIELD OF THE INVENTION

This invention relates to dynamoelectric machines, and more particularly to a unique construction for orienting and terminating windings on rotors utilized in such machines.

BACKGROUND OF THE INVENTION

The power density, reliability, and cost of a dynamoelectric machine are directly related to the physical size and complexity of the machine. Accordingly, manufacturers of dynamoelectric machines continually strive to reduce the complexity and physical size of their machines in an attempt to improve power density, provide enhanced reliability, and reduce cost.

Design improvements allowing reductions in the axial length and the complexity of rotors used in dynamoelectric machines are of particular interest in this regard. During operation, the rotor and associated support structures are subjected to high centrifugal forces and bending movements caused by rotation of the rotor and high internal magnetic fluxes incident with operation of the dynamoelectric machine. This is particularly true in dynamoelectric machines designed for use in aircraft which typically operate at high rotational speeds and utilize very high magnetic flux densities in order to achieve maximum performance with a machine of minimum size and weight.

As the axial length of the rotor is decreased, problems associated with critical speed and bending of the rotor are also diminished. This in turn allows reduction in the size of structural elements comprising the rotor and corresponding reduction in the size of structures supporting the rotor. It will be appreciated, therefore, that, as a result of reductions in the size of structural elements comprising and associated with the rotor, reduction in the axial length of the rotor will allow an overall reduction in the size of the dynamoelectric machine greater than would have been derived solely from the reduction in axial length of the rotor alone.

As complexity of the rotor is decreased, size and cost of the rotor also decrease. As a result, rotor designs comprised of a minimal number of simple parts are highly desirable.

Through the years, designers and manufacturers of dynamoelectric machines have devoted considerable effort toward advancing the state of the art in the design and manufacture of dynamoelectric machines in general, and more specifically toward reduction in the axial length and complexity of the rotors utilized in these machines. Typical of these past efforts are U.S. Pat. No. 3,292,025 to Victor; U.S. Pat. No. 4,217,515 to Long et al; U.S. Pat. No. 4,598,223 to Glennon et al; U.S. Pat. No. 4,603,274 to Mosher.

U.S. Pat. No. 3,292,025 to Victor describes a rotor end winding having a special conductor configuration in an end turn region of a rotor in conjunction with a special coil-to-coil connector which allows a radial transition to be made between coils in the end turn region, thereby removing the necessity for an overlapping or extra conductor layer.

The Victor patent is directed to connections between coils in a rotor having a winding made up of multiple separate coils, whereas the present invention, to be described hereinafter, utilizes a rotor having a winding formed as a single continuous coil, and does not, therefore, require coil-to-coil connectors. In addition, the present invention addresses configuration and termination of the exciter lead portions of the winding, whereas Victor addresses only coil-to-coil connections and does not address the exciter lead portions of the windings.

And finally, Victor states that an object of his invention is to provide an arrangement "which does not employ extra turns or overlapping turns at the end of the rotor", thereby specifically teaching away from the present invention which is directed in part to defining a manner in which the exciter lead portion of the winding can be conveniently crossed underneath the winding at the core ends.

U.S. Pat. No. 4,217,515 to Long et al describes means for embedding end turns of field windings for a rotor in the rotor and restraining the field windings in the rotor by use of wedge means. The rotor of the present invention, to be described hereinafter, utilizes a construction radically different from Long, particularly with regard to placement and support of end turns and the method utilized to restrain the windings.

U.S. Pat. No. 4,598,223 to Glennon et al, assigned to the assignee of the present invention, describes a unique construction for the end turns of stator windings in dynamoelectric machines and is directed to an improved stator end turn construction which provides capability for enhanced cooling and/or a reduction in axial length of the machine. The Glennon patent is directed specifically to stator end turns and does not address the rotor or end turns of windings in a rotor.

U.S. Pat. No. 4,603,274 to Mosher, also assigned to the assignee of the present invention, describes a structure for facilitating precision machine winding of a rotor for a high speed machine and a method of producing a rotor utilizing the structure as defined. Mosher utilizes an insulator having radially spaced rows of notches for guiding turns of a winding to predetermined locations in a precision wound rotor. Wedges are attached following winding to prevent distortion of the winding due to centrifugal forces incident with rotation of the rotor.

Mosher is of special interest because both Mosher and the present invention incorporate structures made from insulative material at each core end, these structures being specifically denoted as an "insulator", according to Mosher, and as the "winding end support" in the present invention. However, the configuration and functions performed by the winding end support of the present invention, described hereinafter, are significantly different from the configuration and function of the insulator of Mosher.

In light of the following description of the present invention, it will be readily appreciated that the present invention is clearly patentably distinct from, and constitutes significant improvement over, prior dynamoelectric machines.

SUMMARY OF THE INVENTION

It is a principal objective of the invention to provide a new and improved dynamoelectric machine. More specifically, it is an objective to provide improvements in rotor construction which allow axial length of the dynamoelectric machine to be reduced, and, in addition, allow such an improved rotor to be manufactured at low cost from a minimal number of simple parts.

An exemplary embodiment of the invention achieves the foregoing objectives in a dynamoelectric machine incorporating a precision wound rotor. The rotor includes a rotor core of magnetizable material having a longitudinal axis and axially spaced core ends, winding end supports of electrically insulating material at the core ends, and a winding. The winding is made up of a plurality of continuously connected turns of wire and also includes at electrically opposite ends a first and a second exciter lead portion. The first exciter lead portion includes a crossover section oriented generally transverse to the longitudinal axis and located at one of the core ends. The plurality of layers of turns is oriented generally parallel to the longitudinal axis and extends around the core, over the crossover section of the first exciter lead portion of the winding, and over both winding end supports, thereby maintaining the core and the winding end supports fixed relative to each other and constraining the crossover section of the first exciter lead portion between the winding and the winding end support. The winding also forms a plurality of end turns at the core ends. A slot is incorporated into the winding end support, the slot being configured and located such that the crossover section of the first exciter lead portion of the winding may be conveniently routed between the winding and the winding end support. A recessed area is also incorporated into the winding end support, the recessed area being configured and located such that the end turns are constrained within the recessed area, thereby preventing deformation of the end turns due to centrifugal forces incident with rotation of the rotor. Incorporation of the slot into the winding end support allows the exciter lead portions of the winding to be conveniently crossed beneath the winding in those instances where a particular winding configuration would otherwise result in inconvenient location of the exciter lead portions. One example of such an instance is a winding having an even number of layers where it is desired to have the exciter lead portions of the winding terminate at diametrically opposite positions with respect to the longitudinal axis in a plane parallel to one of the core ends.

In a winding having an even number of layers, both exciter lead portions of the winding would normally terminate on one side of the longitudinal axis following fabrication of the winding. Prior to the addition of the slot of the instant invention, one of the exciter lead portions of the winding had to be crossed above the end turns of the winding in order to achieve the desired diametrically opposite termination of the exciter lead portions described in the preceding paragraph, thereby resulting in a rotor and dynamoelectric machine having a greater axial length than a rotor and dynamoelectric machine constructed according to the present invention.

The present invention also provides an additional advantage in that, with the crossover section of an exciter lead portion of the winding routed through the slot between the winding and the winding end support, the crossover section of the exciter lead portion is constrained within the slot by the winding, thereby preventing deformation of the crossover section due to centrifugal forces incident with rotation of the rotor. Prior to the addition of the slot of the present invention, additional parts were required in order to constrain the crossover section of the exciter lead portion of the winding. The slot of the present invention eliminates the need for these additional parts, thereby decreasing complexity and cost of dynamoelectric machines constructed according to the present invention in comparison to prior dynamoelectric machines.

The present invention provides a further additional advantage in a preferred embodiment by incorporating the recessed area into the winding end support in order to provide support for the end turns. Prior to incorporation of the recessed area into the winding end support, according to the present invention, additional parts commonly referred to as end turn support pieces were typically required in order to prevent deformation of the end turns of the rotor due to centrifugal forces incident with rotation of the rotor. The recessed area of the present invention eliminates the need for these end turn support pieces, thereby further decreasing complexity and cost of dynamoelectric machines constructed according to the present invention in comparison to prior dynamoelectric machines.

Other objectives and advantages will become apparent from the following description in conjunction with the accompanying drawings.

BRIEF DESCRIPTION OF THE DRAWINGS

FIG. 3 is a shortened sectional view of the rotor of FIG. 2 taken along line 3—3;

FIG. 4 is a sectional view of the rotor of FIG. 2 taken along line 4—4;

FIG. 5 is an end view of the rotor of FIG. 2 with the end turns removed in order to clearly illustrate the crossover section of the first exciter lead portion of the winding crossing beneath the winding via the slot in the winding end support;

FIG. 6 is an end view of an embodiment of the rotor having an odd number of layers of turns of wire.

DESCRIPTION OF THE PREFERRED EMBODIMENT

Figure 1:
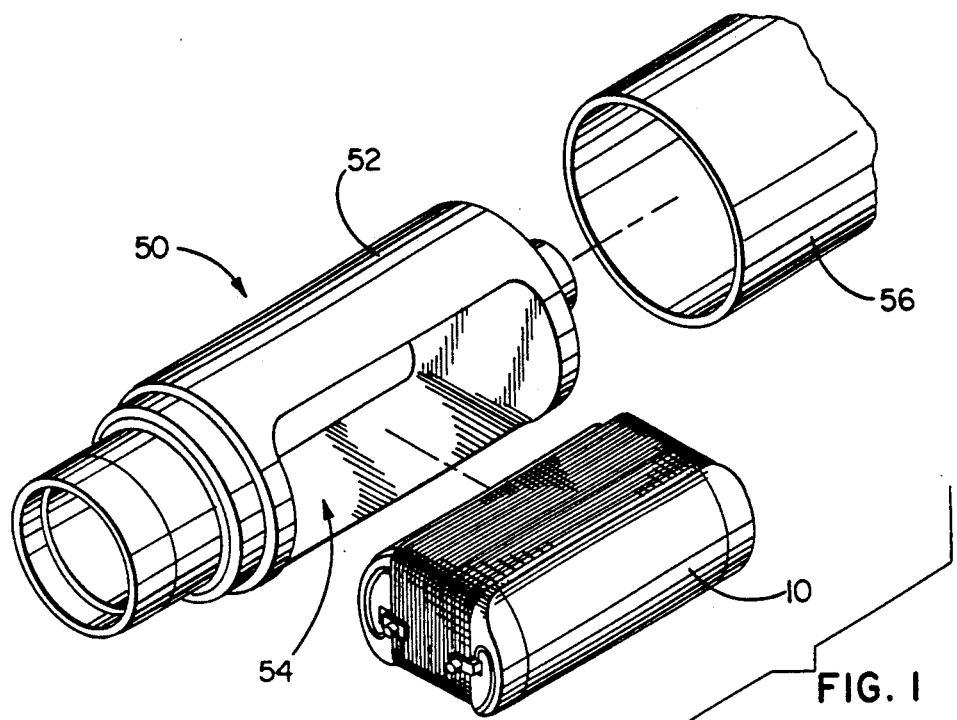
FIG. 1 is an exploded three-dimensional perspective view of a shaft assembly for a dynamoelectric machine embodying the invention.

Reference is now made to FIG. 1 which depicts in an exploded three-dimensional fashion the manner in which the rotor 10 is assembled into an exemplary shaft assembly 50 for a dynamoelectric machine. As seen in FIG. 1, the rotor 10, to be described more fully hereinafter, is inserted into an elongated slot 54 in shaft 52 of the shaft assembly 50, and secured therein by an interference fit between the assembled rotor 10 and shaft 52, and a cylindrical sleeve 56 which is installed over the shaft 52 and rotor 10 by a process such as shrink fitting, thereby completing fabrication of the shaft assembly 50.

Figure 2:
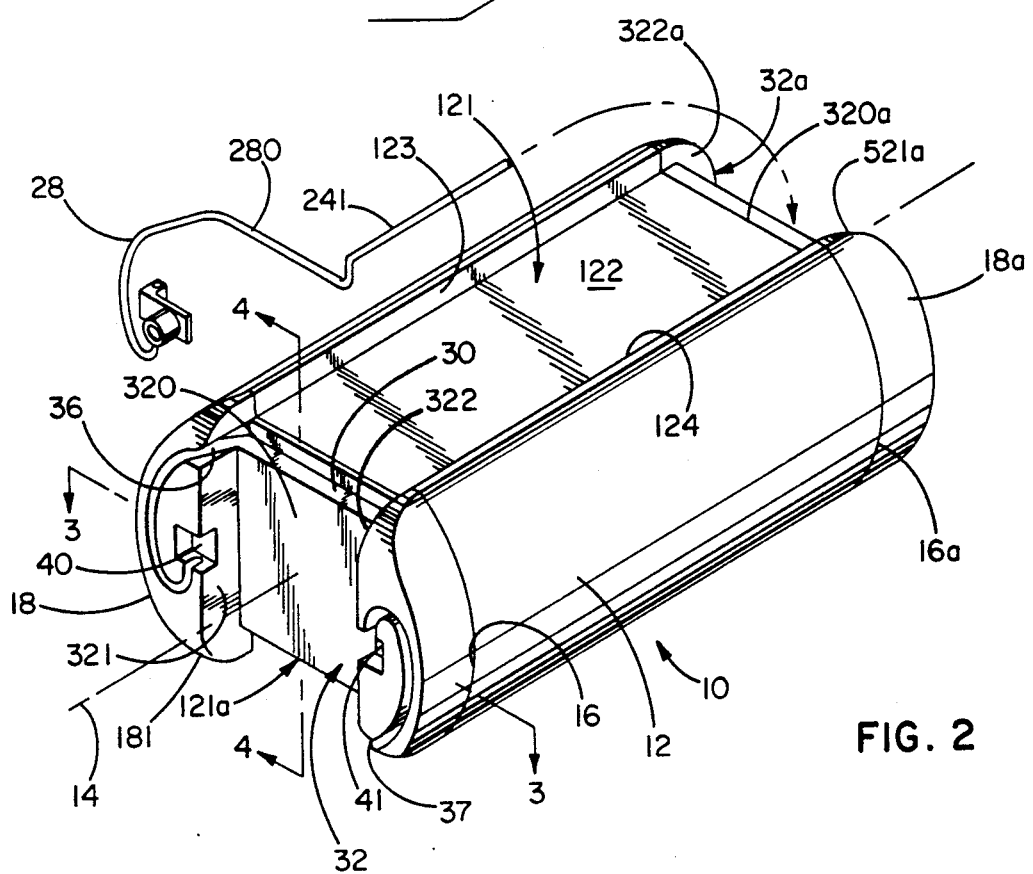
FIG. 2 is a three-dimensional view of an embodiment of the rotor having an even number of layers of turns of wire with the winding removed and showing the configuration of the first exciter lead, including the crossover section of the winding preformed to fit into the slot in the winding end support of the preferred embodiment of the invention.

Reference is now made to FIGS. 2 through 5, depicting a preferred embodiment of a rotor 10, according to the present invention. Referring first to FIG. 2, the rotor 10 includes a magnetic core 12, winding end supports 18, 18a, and, as best seen in FIGS. 4 and 5, a winding 20.

The magnetic core 12, best seen in FIG. 2, has a longitudinal axis 14 and axially spaced core ends 16, 16a. The core is configured generally in the shape of an elongated right circular cylinder and incorporates oppositely opening longitudinally oriented recesses 121, 121a, thereby resulting in the core having substantially an I-shaped cross-section. Recess 121 has a flat lower surface 122 and sidewalls 123, 124 oriented substantially perpendicular to the lower surface 122. In similar fashion, recess 121a has a flat lower surface 122a shown in cross-section in FIG. 4 and sidewalls 123a, 124a (not shown) oriented substantially perpendicular to the lower surface 122a.

Winding end supports 18, 18a, made of electrically insulating material, shown in three-dimensional fashion in FIG. 2 and in cross-section in FIGS. 3 and 4, are utilized at each of the core ends 16, 16a of the rotor 10. As best seen in FIG. 3, each of the winding end supports 18, 18a is configured generally as a flat plate having oppositely facing first and second surfaces 180, 180a and 181, 181a, respectively, and a periphery matched to the I-shaped cross-section of the core 12. The first surfaces 180, 180a of the winding end supports 18, 18a are configured as flat bases 182, 182a, whereby the winding end supports 18, 18a facially engage the core ends 16, 16a. As shown in FIG. 2, the second surfaces 181, 181a of the winding end supports 18, 18a include recessed areas 32, 32a. Recessed area 32 includes a bottom surface 320 parallel to the base 182 and walls 321, 322 intersecting with and perpendicular to the bottom surface 320. Recessed area 32a includes a bottom surface 320a parallel to the base 182a and walls 321a, 322a intersecting with and perpendicular to the bottom surface 320a. The recessed areas 32, 32a are equal in width to the recesses 121, 121a in the core 12 and oriented such that, with the bases 182, 182a of the winding end support 18, 18a facially engaging the core ends 16, 16a, and the peripheries of the winding end supports 18, 18a aligned with the I-shaped cross-section of the core 12, the recessed areas 32, 32a of the winding end supports 18, 18a in conjunction with the recesses 121, 121a in the core 12 form a channel which extends entirely around the rotor 10.

As shown in FIGS. 2 and 4, winding end support 18 also includes a slot 30. The slot 30 is located along an intersection of a plane defined by the bottom surface 320 of the recessed area 32 in winding end support 18 with a plane defined by the lower surface 122 of the recess 121 in the core 12, the slot 30 being configured as an inverted corner at the intersection of the two planes.

The winding 20, as shown in FIG. 4, has a plurality of layers 22, specifically designated as layers 22a, 22b, 22c, 22d, 22e, 22f in FIG. 4, of continuously connected turns of wire 24 as shown in FIG. 3, with the plurality of layers 22 of turns of wire 24 being tightly packed and entirely contained within the channel, best seen in FIG. 2, formed by the recessed areas 32, 32a in the winding end supports 18, 18a and the recesses 121, 121a in the core 12. As shown in FIGS. 2 and 5, the winding 20 further has, at electrically opposite ends, a first exciter lead portion 28 and a second exciter lead portion 29, both first and second exciter lead portions being located at the same core end 16. The first exciter lead portion 28 includes a crossover section 280 positioned within the slot 30 in the winding end support 18. Referring now to FIGS. 4 and 5, the layers 22 and turns of wire 24, which make up the winding 20, are oriented generally parallel to the longitudinal axis 14 and extend around the core 12, over the crossover section 280 of the first exciter lead portion 28 of the winding 20, and over both winding end supports 18, 18a, thereby maintaining the core 12 and the winding end supports 18, 18a fixed relative to each other. As shown in FIGS. 3 and 4, the plurality of layers 22 of turns of wire 24 form a plurality of end turns 26, 26a entirely contained within the recessed areas 32, 32a of the winding end supports 18, 18a at the core ends 16, 16a. The crossover section 280 of the first exciter lead portion 28 of the winding 20 is, therefore, constrained within the slot 30 in the winding end support 18 by the end turns 26 of the winding 20.

As shown in FIGS. 2, 3, and 5, the first and second exciter lead portions 28, 29 of the winding 20 terminate in a first lug 34 and a second lug 35, respectively. The first and second lugs 34 and 35 are disposed substantially equidistant from the longitudinal axis along a radial line passing perpendicularly through the longitudinal axis 14 at the same core end 16 as the first and second exciter lead portions.

Referring now to FIGS. 2, 3, and 5, the second surface 181 of the winding end support 18 includes reliefs 40, 41, and further includes grooves 36 and 37 which connect to the reliefs 40 and 41 respectively, with the grooves 36, 37 running across the second surface 181 and continuing along walls 321 and 322, respectively, of the recessed area 32 in the winding end support 18, whereby the first and second exciter lead portions 28, 29 may be routed past the end turns 26 of the winding 20, and also thereby allowing a portion of the first and second lugs 34, 35 to be recessed slightly below the second surface 181 of the winding end support 18 within the reliefs 40 and 41 respectively, as shown in FIGS. 2 and 3. The grooves 36, 37 and reliefs 40, 41 also provide support for the first and second exciter lead portions 28, 29, thereby preventing deformation of the first and second exciter lead portions due to centrifugal forces incident with rotation of the rotor.

Referring now specifically to FIG. 5, it can be seen that the winding 20 of the preferred embodiment utilizes an even number of layers, specifically six layers designated 22a through 22f, of turns of wire 24. It can also be seen that, for a winding as shown, wherein a first turn 241 is initiated as shown in FIGS. 2 and 5, adjacent the sidewall 124 of the recess 121 in the core 12, and the remainder of the turns of wire 24 are sequentially wound around the rotor 10 abutting one another, first in layer 22a wound across the lower surfaces 122, 122a of the recesses 121, 121a, and in subsequent layers 22b through 22f wound back and forth across the recesses 121, 121a, the last turn of wire 242 will end on the same side of the longitudinal axis 14 where the first turn of wire 241 was initiated whenever the winding 20 has an even number of layers. It will be appreciated that the crossover section 280 of the first exciter lead portion 28 of the winding, particularly when practiced in conjunction with the slot 30 in the winding end support 18 of the preferred embodiment of the present invention, allows the first exciter lead portion 28 to be conveniently crossed under the end turns 26 of the winding 20 and terminated diametrically opposite the second exciter lead portion 29.

It will be further appreciated that, with the crossover section 280 located within the slot 30, and thereby constrained beneath the end turns 26, axial length of the rotor is not increased by the addition of the crossover section, and additional hardware is not required to prevent deformation of the crossover section 280 of the first exciter lead portion 28 of the winding 20 due to centrifugal forces incident with rotation of the rotor, in contrast to prior rotor designs wherein a crossover section was utilized but not constrained beneath the end turns. In similar fashion, with the end turns 26, 26a contained within the recessed areas 32, 32a in the winding end supports 18, 18a, additional hardware, such as separate end turn support pieces utilized in prior rotor designs, are not required in a rotor, according to the present invention, in order to prevent deformation of the end turns 26, 26a due to centrifugal forces incident with rotation of the rotor 10.

Although the preferred embodiment given hereinbefore with reference to FIG. 5 utilized a rotor 10 having a winding 20 including an even number of layers 22 of turns of wire 24, it will be appreciated that the various features of the invention may be practiced with advantage, either independently or when combined in a manner differing from the preferred embodiment, in other embodiments such as the rotor 10 illustrated in FIG. 6 which utilizes a winding 20 having an odd number of layers 22 of turns of wire 24. The embodiment as depicted in FIG. 6 is identical to the preferred embodiment except for the aforementioned difference in the number of layers 22 of turns of wire 24, and the elimination of the crossover section 280 of the first exciter lead portion 28 of the winding 20 and the slot 30 for receipt of the crossover section 280 in the winding end support 18, since neither the crossover section 280 nor the slot 30 are required in an embodiment of the invention having an odd number of layers 22 of turns of wire 24.

From the foregoing description, it is apparent that the invention described provides an improved rotor for a dynamoelectric machine in which novel features, such as locating the crossover section of the first exciter lead portion of the winding between the winding and the core end or winding end support, and incorporation of the slot, recessed areas, grooves, and reliefs into the winding end supports, allow construction of a rotor having a shorter axial length and reduced complexity when compared to prior rotor designs, and, in addition, allow such an improved rotor to be manufactured at low cost from a minimal number of simple parts. It is further apparent that dynamoelectric machines utilizing a rotor, according to the present invention, will offer increased power density and reliability at lower cost than prior dynamoelectric machines as a result of the shorter axial length and reduced complexity of the rotor, according to the present invention.

Although this invention has been illustrated and described in connection with the particular embodiments illustrated, it will be apparent to those skilled in the art that various changes may be made therein without departing from the spirit of the invention as set forth in the following claims.

I claim:

1. A precision wound rotor comprising:
a magnetic core having a longitudinal axis and axially spaced core ends; and
a winding having a plurality of continuously connected turns of wire, with said turns of wire extending around the core in an axial direction and forming a plurality of end turns at the axially spaced core ends;
said winding further having at a one electrical end thereof an exciter lead portion, whereby the winding may be connected to a source of electrical power;
said exciter lead portion including a crossover section oriented in a direction generally mutually transverse to the axis and to the end turns, with said crossover section being disposed between the end turns and one of the core ends, the end turns thereby constraining the crossover section between the end turns and the one of the core ends.

2. A precision wound rotor comprising:
a magnetic core having a longitudinal axis and axially spaced core ends;
a winding end support made of electrically insulating material at one of the core ends; and
a winding having a plurality of continuously connected turns of wire, with said turns of wire extending around the core and over the winding end support in a generally axial direction, with said turns of wire forming a plurality of end turns extending transverse to the axis across the winding end support and constraining the winding end support against the one of the core ends;
said winding further having at one electrical end thereof an exciter lead portion, whereby the winding may be connected to a source of electrical power;
said exciter lead portion including a crossover section oriented in a direction generally mutually transverse to the axis and to the end turns, with said crossover section being disposed between the end turns and the winding end support, the end turns thereby constraining the crossover section between the end turns and the winding end support.

3. A precision wound rotor, according to claim 2, wherein the plurality of turns of said winding form a plurality of layers of end turns at the core ends.

4. A precision wound rotor, according to claim 2, further comprising:
a slot in a surface of the winding end support wherein the exciter lead portion of the winding may be routed between the end turns and the winding end support, the slot thereby allowing the exciter lead portion of the winding to be recessed at least partially below the surface of the winding end support.

5. A precision wound rotor, according to claim 2, wherein the exciter lead portion is terminated in a lug, and wherein a surface of the winding end support includes a relief and a groove extending across the surface of the winding end support in a manner allowing the exciter lead portion and the lug to be recessed at least partially below the surface of the winding end support.

6. A precision wound rotor, according to claim 2, further comprising:
a recessed area in said winding end support configured and located such that the end turns are constrained within said recessed area, thereby preventing deformation of the end turns due to centrifugal forces incident with rotation of the rotor.

7. A precision wound rotor according to claim 4, wherein said core is configured generally as an elongated right circular cylinder and includes oppositely opening longitudinally oriented recesses, thereby resulting in the core having substantially an I-shaped cross-section, said recesses having a flat lower surface and sidewalls oriented substantially perpendicular to the lower surface.

8. A precision wound rotor, according to claim 7, wherein said winding end support is configured generally as a flat plate having oppositely facing first and second surfaces and a periphery matched to the I-shaped cross-section of the core and also having said first surface configured as a flat base whereby the winding end support facially engages the one of the core ends.

9. A precision wound rotor, according to claim 8, wherein said recessed area in the winding end support has a bottom surface parallel to the base and walls perpendicular to the base, said recessed area being equal in width to the recesses in the core and oriented such that, with the base of the winding end support facially engaging the one of the core ends, and the periphery of the winding end support aligned with the I-shaped cross-section of the core, the recessed area of the winding end support, in conjunction with the recesses in the core, form a channel for receipt of the winding.

10. A precision wound rotor, according to claim 9, wherein the winding end support includes a slot which extends along an intersection of a plane defined by the bottom surface of the recessed area in the winding end support with a plane defined by the lower surface of one of the recesses in the core, said slot being configured as an inverted corner extending along said intersection.

11. A precision wound rotor, according to claim 10, wherein the crossover section of the exciter lead portion of the winding is positioned within the slot in the winding end support, and the end turns are contained within the recessed area of the winding end support at the one of the core ends, said end turns thereby constraining the crossover section of the exciter lead portion of the winding within the slot.

12. A precision wound rotor, according to claim 11, wherein the exciter lead portion is terminated in a lug, and wherein the second surface of the winding end support includes a relief and a groove, with the groove extending from the relief across the second surface of the winding end support and along one of the walls of the recessed area of the winding end support in a manner allowing the exciter lead portion of the winding to be routed past the end turns in a manner allowing the exciter lead portion and the lug to be recessed slightly below the second surface of the winding end support.

13. A precision wound rotor comprising:
a magnetic core having a longitudinal axis and axially spaced core ends;
a winding end support made of electrically insulating material at one of the core ends;
a winding having a plurality of continuously connected turns of wire, with said turns of wire extending around the core and over the winding end support in a generally axial direction with said turns of wire forming a plurality of end turns extending transverse to the axis across the winding end support and constraining the winding end support against the one of the core ends;
said winding further having at one electrical end thereof an exciter lead portion terminating in a lug whereby the winding may be connected to a source of electrical power;
said winding end support including in a surface thereof a groove and a relief for receipt respectively therein of the exciter lead portion and the lug, the groove and the relief thereby providing means by which the exciter lead portion and the lug may be at least partially recessed below the surface of the winding end support.

14. A precision wound rotor, according to claim 13, wherein said core is configured generally as an elongated right circular cylinder and includes oppositely opening longitudinally oriented recesses, thereby resulting in the core having substantially an I-shaped cross-section, said recesses having a flat lower surface and sidewalls oriented substantially perpendicular to the lower surface.

15. A precision wound rotor, according to claim 14, wherein said winding end support is configured generally as a flat plate having oppositely facing first and second surfaces and a periphery matched to the I-shaped cross-section of the core and also having said first surface configured as a flat base whereby the winding end support facially engages the one of the core ends.

16. A precision wound rotor, according to claim 15, wherein the second surface of the winding end support further includes a recessed area for receipt therein of the end turns of the winding with said recessed area having a bottom surface parallel to the base and walls perpendicular to the base, said recessed area being equal in width to the recesses in the core and oriented such that, with the base of the winding end support facially engaging the one of the core ends, and the periphery of the winding end support aligned with the I-shaped cross-section of the core, the recessed area of the winding end support, in conjunction with the recesses in the core, form a channel for receipt therein of the winding.

17. A precision wound rotor, according to claim 16, wherein the relief is located in the second surface of the winding end support, and the groove extends from the relief across the second surface and along one of the walls of the recessed areas in the winding end support, thereby allowing the exciter lead portion of the winding to be conveniently routed past the end turns of the winding.

* * * * *